UNITED STATES PATENT OFFICE.

JONATHAN K. LIPPEN, OF BATTLE CREEK, MICHIGAN, ASSIGNOR, BY MESNE ASSIGNMENTS, TO POSTUM CEREAL COMPANY, INC., OF WILMINGTON, DELAWARE, A CORPORATION OF DELAWARE.

CORN-FLAKES AND PROCESS OF MAKING SAME.

1,364,634.   Specification of Letters Patent.   Patented Jan. 4, 1921.

No Drawing.   Application filed April 1, 1919.   Serial No. 286,789.

*To all whom it may concern:*

Be it known that I, JONATHAN K. LIPPEN, a citizen of the United States of America, and a resident of Battle Creek, Michigan, have invented a new and useful Improvement in Corn-Flakes and Processes of Making Same, which invention is fully set forth in the following specification.

This invention relates to the art of cereal foods and the preparation thereof, and more particularly to flaked and toasted cereal foods. Heretofore, in making corn flakes, it has been the practice to treat the kernels of corn to remove the husk or bran and the germ, and then break the kernels into large particles, known as coarse corn grits, each of which is of such a size that, when rolled out into a flake, it will make a flake approximately three-quarters inch in diameter. When the kernels are broken or divided to form these coarse corn grits, there is a large quantity of smaller particles formed which are screened off from the coarse corn grits in the form of corn flour and what is known to the trade as "brewers' grits". Other small particles composed mainly of the flinty part of the corn are known as "cones". Ordinarily from three carloads of shelled corn there are obtained approximately one carload of coarse grits capable of being rolled into corn flakes, one carload of corn flour, brewers' grits and cones, and one carload of bran and germs. So far as I am aware, prior to the present invention corn flakes have been made solely from coarse corn grits, each particle of the grit being rolled into a single flake. Smaller particles of corn such as corn flour, corn meal, brewers' grits and cones have not been considered suitable for the manufacture of corn flakes.

The object of the present invention is to provide a method whereby all of the corn, by which is meant herein, maize or Indian corn, with the exception of the bran or husk and the germ, may be converted into toasted corn flakes in no way inferior in quality or market value to the corn flakes heretofore made from coarse corn grits. With this object in view, the invention, broadly stated, consists in separating the bran or husk and the germ from the kernels of corn, and then converting the corn, thus freed from the bran and the germ, into a plastic or dough-like mass, forming from said dough-like mass particles approximating in size the coarse corn grits heretofore employed (which particles, for want of a better name I call "pellets") and then flaking these pellets by the usual or any suitable flaking means, and toasting the same in any suitable manner.

If desired, all of the kernel, after the bran and germ have been removed, may be broken into small particles and then formed into flakes as above described. Preferably, however, the corn kernels are cracked or broken, the coarse corn grits are then separated out by suitable screens to be formed into flakes by any suitable well-known method; and the corn flour, cones, brewers' grits or even corn meal or any desired mixture of these, or any two or more of these, are placed, with a suitable amount of water, in a suitable cooking vessel, as for example a revolving steam cooker, together with seasoning, as salt and sugar, and are subjected to a cooking operation. The cooking to which the mass is subjected renders the particles glutinous or tacky, and, when it is removed from the cooker, it is worked so as to form a cohesive, plastic, dough-like mass and is made up into pellets approximately the size of a small pea. The cooking operation may be carried out complete in a single operation, in which event the mass is preferably placed in a revolving steam cooker and cooked for three or four hours under steam pressure of from fifteen to eighteen pounds. Or, the mass may be cooked in a revolving steam cooker under about fifteen pounds steam pressure from thirty to sixty minutes; the mass then taken out and formed into pellets, and the pellets thus formed replaced in the steam cooker and cooked for approximately two and a half hours under about eighteen pounds steam pressure. This will serve to thoroughly cook the corn.

Any suitable means may be employed for forming the dough into pellets. Preferably, the plastic dough-like mass, either partially or fully cooked, as the case may be, is formed into filaments which are then separated into short lengths constituting the pellets. Thus the dough-like mass may be placed in a suitable vessel having a perforated bottom and pressure applied in any suitable manner to force the mass through the perforations to form filaments, whose diameter will depend upon the diameter of the perforations.

These filaments are then cut into suitable lengths, preferably by means of a revolving knife, or knives, working just beneath the perforated receptacle. Any other means or mechanism, however, may be employed for forming the dough-like mass into pellets without departing from the spirit of the invention, the particular object being to form the pellets, the manner of their formation not being essential.

When the pellets are formed from the mass after preliminary cooking, and then subsequently subjected to an additional cooking operation, they will be found to have retained their individuality as pellets as effectively as when formed after a single complete cooking operation. As the next step, the pellets are partially dried in any suitable manner, as for example in any well known commercial drying mechanism. This partial drying operation is carried on until the pellets are materially dried on their exterior portion, while the interior portion still retains an appreciable amount of moisture. The pellets are then treated for the purpose of uniformly distributing the moisture through the pellets to toughen or "temper" the same and put them in the proper condition for rolling into flakes. This tempering is preferably accomplished by treating the pellets in the manner heretofore employed in tempering coarse corn grits, to wit, by placing the pellets in a suitable tub or vat where they are allowed to stand for a suitable time, approximately from ten to fourteen hours, after which they are found to be of a tough, rubbery consistency. These tempered pellets are then passed through any suitable flaking machine, for example between rolls, which forms them into flakes of a suitable or any desired thickness, after which they are toasted in any suitable or well known toasting apparatus.

Instead of partially cooking the entire mass of the finely divided particles of corn and then working the same into a plastic or dough-like mass, I may and sometimes do take a suitable quantity of corn flour, cook the same for a suitable length of time, say fifteen minutes in a steam cooker until the same becomes thoroughly tacky, and then mix this cooked corn flour with from one to five times its mass of finely divided uncooked corn particles such as corn meal, cones or brewers' grits, using sufficient moisture to effect this operation, then form the mass into pellets, and then cook, temper, flake and toast the same as described above.

In flaking the pellets, the same may be rolled or otherwise formed of any desired thickness. Thus I may form the same into thin, shaving-like flakes, or I may form the same into flakes of appreciable thickness and treat them during the toasting operation so as to form a plurality of puffs on the opposite faces of the flakes, in the manner set forth in U. S. patent to Martin, No. 1,161,323.

By the process above described, I am able to convert all of the corn, with the exception of the bran, and the germ, into a delicate, nourishing and highly palatable article of food, that made from the fine particles being in every way equal to the toasted corn flakes heretofore made from coarse corn grits alone. Instead of employing cooked corn flour as the tacky substance for making the dough, as above set forth, any other suitable agglutinant, preferably of cereal origin, as malt for example, may be employed, without departing from the spirit of the invention, the particular object being to form the finely divided particles of corn into a dough-like mass from which pellets may be shaped.

What is claimed is:—

1. The method of making corn flakes, which consists in taking corn free from bran and germ, forming the same into a plastic mass, forming pellets from said mass, flaking the pellets, and then toasting the flakes.

2. The method of making corn flakes, which consists in freeing the corn from the bran and the germ, subjecting it to a cooking operation, then forming it into pellets, flaking the pellets, and toasting the flakes.

3. The method of making corn flakes from finely divided particles of corn, which consists in subjecting said particles to a cooking operation, forming the mass into pellets, partially drying and then tempering the pellets to toughen them, then flaking the pellets, and toasting the flakes.

4. The method of making corn flakes which consists in freeing the corn kernels from bran and germ and dividing the kernels into small parts, forming said divided parts into pellets, flaking the pellets, and then toasting the flakes.

5. A method of making corn flakes from finely divided particles of corn, which consists in moistening a mass of said particles, forming the same into pellets, cooking the pellets, flaking the cooked pellets, and then toasting the flakes.

6. The method of making corn flakes from finely divided particles of corn, which consists in subjecting a mass of said particles to the action of heat and moisture, then forming the mass into pellets, cooking the pellets, flaking the cooked pellets, and then toasting the flakes.

7. The method of making corn flakes from finely divided particles of corn, which consists in subjecting a mass of said particles to the action of heat and moisture, then forming the mass into pellets, cooking the pellets, partially drying said cooked pellets, flaking the pellets, and then toasting the flakes.

8. The method of making corn flakes, which consists in partially cooking a mass of corn freed from the bran and germ, forming the partially cooked corn into pellets, further cooking the pellets, partially drying the cooked pellets, tempering the pellets, and then flaking the tempered pellets and toasting the flakes.

9. The method of making corn flakes, which consists in subjecting the corn freed from bran and germ to a cooking temperature in the presence of moisture, then forming the mass into pellets, and then flaking the pellets and toasting the flakes.

10. The method of making corn flakes, which consists in partially cooking finely divided particles of corn, forming the partially cooked mass into pellets, further cooking the pellets, partially drying the cooked pellets, tempering the partially dried pellets, and then flaking and toasting the flakes.

11. The method of making corn flakes, which consists in forming finely divided particles of corn into a dough, making pellets from said dough, cooking the pellets, then flaking the pellets and toasting the flakes.

12. The method of making corn flakes, which consists in forming finely divided corn into a dough by the aid of a tacky substance, making pellets from said dough, cooking the pellets, then flaking the pellets and toasting the flakes.

13. The method of making corn flakes, which consists in making a dough of finely divided particles of corn by the use of corn flour as an adherent, forming the dough into pellets, cooking, partially drying and tempering the pellets, flaking the pellets, and then toasting the flakes.

14. A cereal food consisting of cooked, flaked and toasted masses of finely-divided glutinated particles of corn free from bran and germ.

In testimony whereof I have signed this specification.

JONATHAN K. LIPPEN.